July 22, 1969        R. R. CORNELL        3,456,701

METHOD FOR GROOVING LAMINAR SHEET MATERIAL

Original Filed July 19, 1963        4 Sheets-Sheet 1

INVENTOR.
RICHARD R. CORNELL
BY Hamilton & Cook
ATTORNEYS

INVENTOR.
RICHARD R. CORNELL
BY Hamilton & Cook
ATTORNEYS

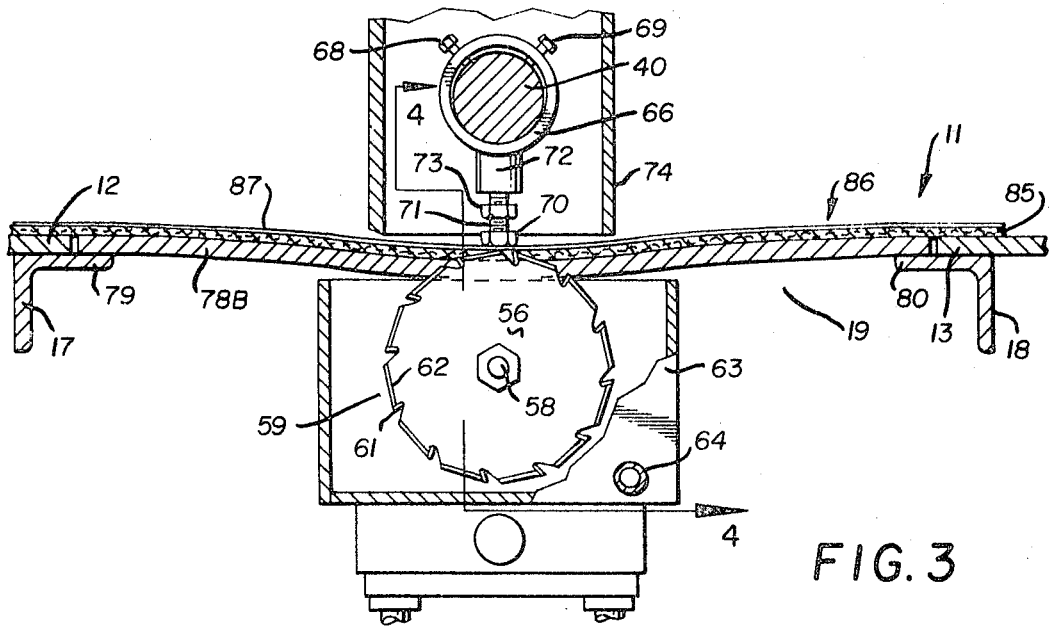

United States Patent Office 3,456,701
Patented July 22, 1969

3,456,701
METHOD FOR GROOVING LAMINAR SHEET MATERIAL
Richard R. Cornell, Newcomerstown, Ohio, assignor, by mesne assignments, to Richard Cornell and Associates, Newcomerstown, Ohio, a partnership
Original application July 19, 1963, Ser. No. 296,221, now Patent No. 3,322,177, dated May 30, 1967. Divided and this application Oct. 11, 1966, Ser. No. 620,192
Int. Cl. B27d 1/00
U.S. Cl. 144—316                                    2 Claims

ABSTRACT OF THE DISCLOSURE

A method for forming a folded corner in sheet material so as to present an unbroken facing surface. A binding tape is adhered to the facing surface so as to span the line along which the sheet material is to be folded. A mitered groove is rabbeted along the fold line in the side of the sheet material opposite the binding tape. An adhesive material is applied to the mitered groove, and the sheet material is bent therealong. When the bend is stabilized, as by the setting of the adhesive, the binding tape is removed.

---

This application is a divisional application of my prior copending application Ser. No. 296,221, filed July 19, 1963, and now Patent No. 3,322,177.

The present invention relates generally to angular folding of sheet material. More particularly, the present invention relates to a method and apparatus for accurately grooving flexible sheet material, which is laminar at least along the groove, to permit folding thereof. Specifically, the present invention relates to a method and apparatus for incising or accurately cutting a precise mitered rabbet into the back of a flexible laminar material for angularly folding along the rabbet without scouring the facing surface.

With the advent of decoratively clad or faced, sheet materials, more and more table tops, furniture cabinets, countertops, kitchen cabinets and the like, are being constructed of such materials. Because of the decorative finish on the face of these materials, they require no finishing after they are assembled. Moreover, they are extremely durable.

Such materials utilize a strength providing base, such as plywood, fiberboard or other composition board faced with a thin sheet, or veneer, of decorative film or wood bonded to the base. The facing is often only a few thousandths of an inch thick, and the base is usually an eighth, a quarter or some other dimensional fraction of an inch standard to structural materials.

This composite material is manufactured in modular dimensional sheets such as four by eight, four by twelve or the like, and is accordingly rather flexible. To construct items having finished surfaces in more than one plane from this material, it is necessary to assemble planar components of the item formed from the material with the facing in the proper direction and join the corners in a mitered fit in order to prevent the unfinished edges of the base from showing. However, in even the most meticulously mitered joints the joinder line of the facing materials stands out as an unsightly reminder that the material is a facsimile of that apparent from the design of the facing. This is especially noticeable when the facing simulates a wood grain.

Further complications are attendant upon accurately rabbeting or grooving such laminar sheet materials because the variation in the thickness of the base may be in the range of twenty to thirty thousandths of an inch and the thickness of the facing to which the cut must extend is on the order of one-tenth that amount.

It is therefore an object of the present invention to provide a method for grooving a flexible laminar composite sheet accurately and to a uniform tolerance less than the variation in the thickness of the board.

It is another object of the present invention to provide a method for grooving a flexible laminar composite sheet in such a way as to permit accurate angular folding of the sheet along the groove so as to provide accurate shaping of the sheets to a predetermined pattern.

It is a further object of the present invention to provide a method for grooving a flexible laminar composite sheet so as to maintain a continuous unbroken continuity in the facing when the material is folded along the groove.

It is a still further object of the present invention to provide an improved method for grooving flexible laminar composite sheets to permit the folding of neat decorative corners along the groove.

These and other objects which will become apparent in the following specification are accomplished by means hereinafter described and claimed.

One preferred embodiment of an apparatus capable of performing the method is shown by way of example in the accompanying drawings and hereinafter described in detail without attempting to show all the various forms and modifications in which the invention might be embodied; the invention being measured by the appended claims and not by the details of the specification.

In the drawings:

FIG. 3 is a further cross section taken substantially on line 3—3 of FIG. 2 and depicting a work piece passing through the apparatus;

FIG. 4 is a further cross section taken substantially on line 4—4 of FIG. 3;

In general, an apparatus adapted to perform the method according to the concept of the present invention for grooving flexible, laminar sheets passed longitudinally therethrough has a frame which carries a work table having a feed and receiving portion. The feed and receiving portions are longitudinally aligned and positioned at the same height but are separated by a hiatus that extends laterally therebetween. A yielding support means spans the hiatus at the same level as the two portions of the work table and is provided with an opening through which a rabbet cutting means can extend upwardly from beneath the yielding support means. The rabbet cutting means and the table are movable relative to each other in order to selectively adjust the relative height between the uppermost extent of the rabbet cutting means and the table.

A control shoe is dependingly mounted from above the table and faces downwardly in opposition to the rabbet cutting means. This shoes is independently vertically adjustable with respect both to the rabbet cutting means and the work table.

Figure 1:
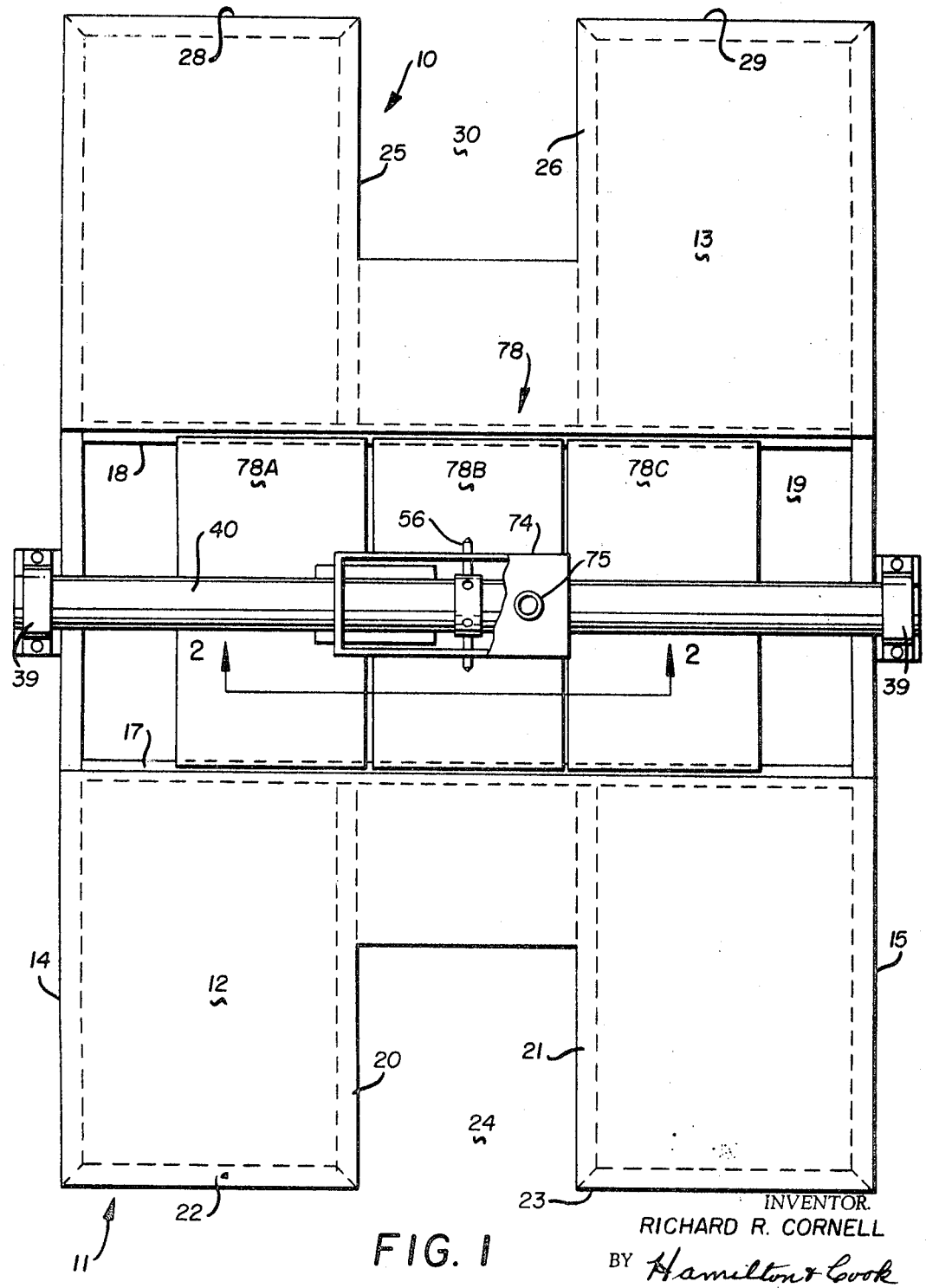
FIG. 1 is a top plan view of the peferred embodiment of the apparatus capable of performing the process according to the concept of the present invention.

Referring more particularly to the drawings, an apparatus constructed in accordance with the present invention is designated generally by the numeral 10. To assure the accuracy requisite to the operation performed by such a machine, it is preferred that the apparatus be carried on a rigid frame. As shown in FIG. 1, the frame supports the work table, indicated generally by the numeral 11, which is divided generally into a feed portion and a receiving portion 12 and 13, respectively. The longitudinal edges of these two portions of the work table are both supported on longitudinal side frame members 14 and 15. Lateral bracing members 17 and 18 extend between the longitudinal side members 14 and 15. These lateral bracing members 17 and 18 are spaced longitudinally apart and support the opposed and facing edges of the feed and receiving portions 12 and 13 of work table 11 on substantially the same level and separate them by a hiatus, or open space 19, which extends laterally between the side frame members 14 and 15.

The remainder of feed portion 12 is supported by two longitudinally oriented medial frame members 20 and 21 which connect at one end to the lateral bracing member 17 and at the other end to frame end members 22 and 23, respectively, extending laterally inwardly from the respective longitudinal side members 14 and 15 to which they are secured. A section of the feed portion 12 of table 11 may be omitted between the medial frame members 20 and 21, if desired, to provide a work bay 24 for the operator to more closely approach the hiatus 19.

The receiving portion 13 of table 11 may be similarly constructed with longitudinally oriented medial frame members 25 and 26 connected at one end to the lateral bracing member 18 and at the other end to frame end members 28 and 29, respectively, extending laterally inwardly from the respective side members 14 and 15 to which they are secured. Receiving portion 13 may also be provided with a work bay 30, similar to work bay 24 in the feed portion 12.

Figure 2:
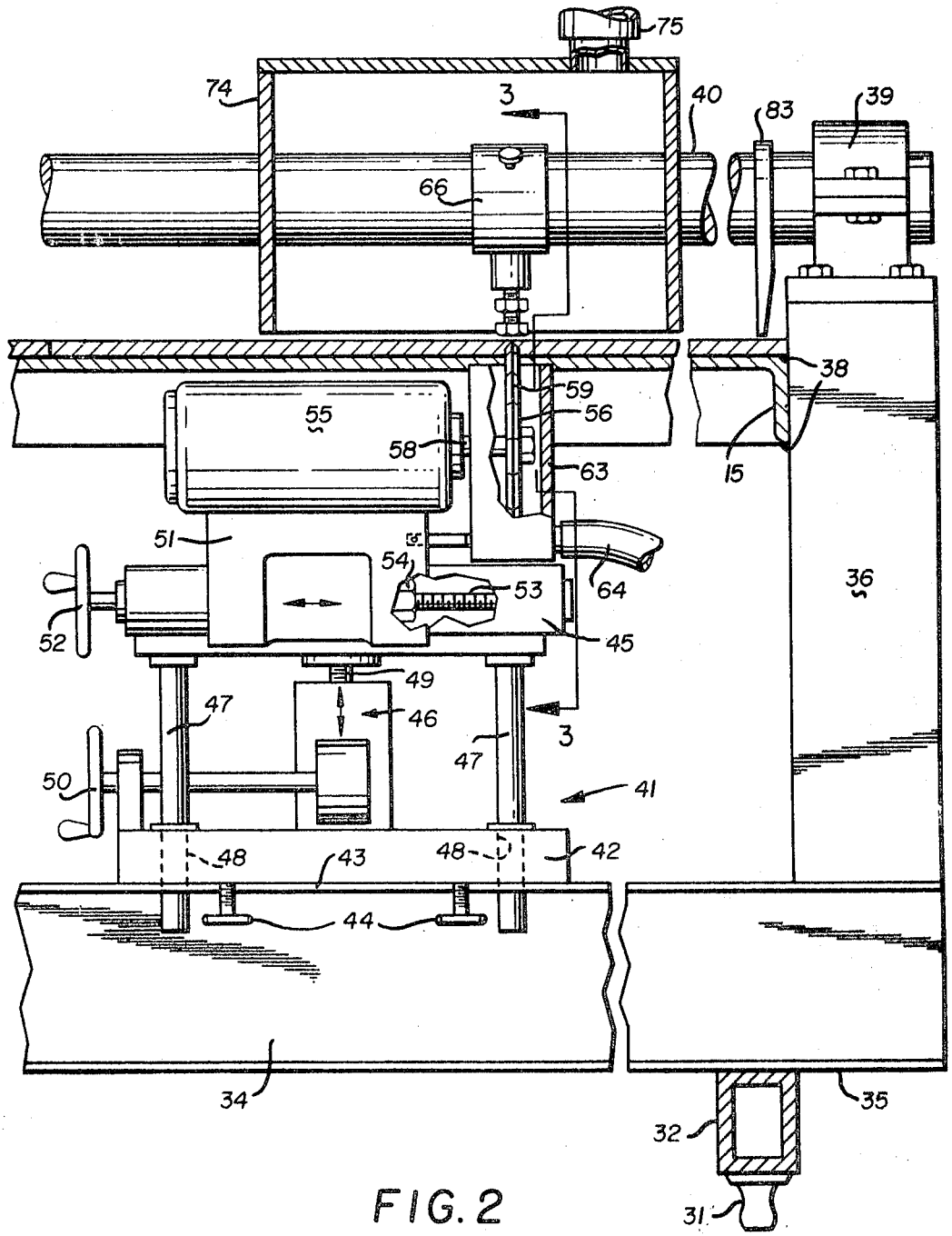
FIG. 2 is an enlarged cross section taken substantially on line 2—2 of FIG. 1.

The hereinbefore-described frame members comprise the upper or work table frame which is spaced at a convenient work distance above the floor level. It has been found desirable to construct a lower, or support, frame portion with a similar structural network just above the floor level and interconnected to the upper or support frame portion with a series of vertical members not shown, particularly at the corners and at the intersection of the various longitudinally and laterally oriented members of the work table frame. Suitable feet, are, of course, provided to rest the apparatus on the floor. One such foot 31 is disclosed in FIG. 2, dependingly secured to the longitudinal frame side member 32 of the lower frame portion. A rigid cutting means support, such as the wide flange beam 34, shown in FIG. 2, extends laterally of the apparatus, medially and below the hiatus 19, and preferably is secured to the lower frame portion longitudinal side members, such as member 32.

Each end 35 of the cutting means support 34 extends laterally outwardly beyond the longitudinal side members of both the upper and lower frame portion. Each end 35 supports a vertically upwardly extending stanchion 36, which, shown in FIG. 2, engages the outer surface of the longitudinal side member 14 or 15 of the upper frame portion and is secured thereto, as by welding, 38, for the greatest possible rigidity.

The upper end of each stanchion 36 is provided with suitable means, such as the split clamp 39, to receive and retain a head bar 40 in fixed nonrotative position. This head bar 40 laterally spans the apparatus in spaced relation above the hiatus 19 between the longitudinally aligned feet in receiving portions of the work table and extends between the opposed stanchions 36 vertically upwardly of the cutting means support 34. The purpose of head bar 40 will be hereinafter more fully explained.

An adjustable carriage, indicated generally by the numeral 41, is carried on support beam 34. The base 42 of carriage 41 slidably engages the upper flange 43 of support beam 34 and may be locked in selected positions along support 34 by screw clamps 44. Carried by and adjustably movable with respect to the base 42 is a carriage deck 45. Carriage deck 45 is vertically movable with respect to base 42 by a jack screw arrangement 46. A plurality of guide pins 47 depend from the carriage deck 45 and extend slidingly through receiving bores 48 in the base 42. Guide pins 47 prevent rotation of the deck 45 about the vertical axis of the jack screw 49 either during or after vertical adjustment of the deck height by rotation of vertical control lever 50.

A motor mount 51 is carried on the carriage deck 45 in such a way that it will slide laterally of the apparatus 10 along the deck 45 in response to rotation of adjusting handle 52. Such adjusting device can be a rotatably threaded shaft 53 journaled to rotate in a fixed position within deck 45 and engaging a threaded boltlike member 54 within the motor mount 51 in a well-known manner.

The motor 55 secured in mount 51 has rabbet cutting blade means 56 affixed to the motor shaft 58. The teeth 59 are beveled transversely to the cutting direction, as by equilateral edges 60, to provide the desired miter in the groove cut thereby. Cutting blade means 56 preferably has carbide tips 61 backed by a straight shank 62 to provide a sturdy, sharp cutting edge suitable for cutting with the grain, across the grain, both simultaneously (as in plywood construction), or through material having substantially no grain at all.

A lower chip box 63 encloses the cutting blade means 56 beneath the level of the work table 11 by a suitable attachment to motor mount 51, and is thus movable with the cutting blade means 56. A suction pipe 64 communicates with the interior of box 63 to remove the chips and dust therein.

A collar 66 engages the rigid head bar 40 and is slidably positionable therealong. As shown more particularly in FIG. 3, a pair of angularly opposed set bolts 68 and 69 may be loosened to permit the collar 66 to slidably engage the head bar 40. However, when the collar is selectively positioned at a location from which it is desirable that it not move, tightening the set bolts 68 and 69 locks the collar in the desired location.

Dependingly supported from the collar 66 is an adjustable control shoe 70. The control shoe 70 has a threaded shank portion 71 which screws into boss 72 which extends outwardly of collar 66. A lock nut 73 on shank portion 71 maintains the shoe in vertically selected position with respect to collar 66.

An upper chip box 74 is carried on head bar 40 and substantially embraces the shoe 70 and the area in proximity to the cutting blade means 56 above the level of work table 11. A suction pipe 75 communicates with the interior of box 74 to remove the chips and dust therefrom.

A yielding support means 78 spans the hiatus 19. Yielding support means 78 rests on the flanges 79 and 80 of lateral bracing means 17 and 18, respectively, to lie in substantially the same plane, or on the same level, as that of the feed and receiving portions of the work table 11. In the immediate proximity to the cutting blade means 56 a cutting slot 81 is provided in the yielding support means through which the cutting blade means 56 can extend. Because of the lateral adjustability of cutting blade means 56, the yielding support means 78 is preferably made of a plurality of longitudinal segments, such as 78A, 78B and 78C, to provide lateral placement of the segment 78B which contains cutting slot 81. The function of the yielding support means 78 will be more fully understood and explained with the following explanation of the operation of the grooving apparatus 10.

To angularly fold a sheet of flexible material having a decorative facing it is first necessary to groove the material along the fold line. Assuming that the material is to be folded to present a 90° corner with the decorative facing on the outside of the corner, it will be necessary to cut a rabbet in the reverse side of the board, the rabbet being mitered to the 90° of the desired ultimate bend, or fold.

First, the cutting blade means 56 is moved laterally of the apparatus 10 until it is positioned the desired distance from the longitudinal guide means 83 which may be fixed to the frame, or the head bar 40, as shown. In this way, when the edge of the board contacts the guide means 83 as it is passed over the rabbet cutting means 56 the cut made thereby will be at a controlled distance inwardly of the edge of the board. It should be apparent from the foregoing specific description that sliding the base 42 along the flange 43 of support beam 34 will provide the rough adjustment of the lateral position of the cutting blade means 56 which can be maintained by locking clamps 44. Minute adjustment is then obtained by turning the control lever 52 to laterally slide the motor mount 51 with respect to the carriage deck 45 laterally fixed with respect to the base 42. It must be noted that unlike a regular saw the distance is not measured to the side of the blade means 56 to compensate for the kerf, but rather, is measured to the tip of the cutting blade means in order to center the kerf about the fold line.

After the lateral position of the cutting blade means 56 is secured the vertical position is adjusted. The control lever 50 is turned until the tip of the highest tooth 59 extends above the level of the work table an amount equal to the minimum thickness of the sheet to be folded. Theoretically, all the teeth measure exactly the same radial dimension from the rotational axis of the cutting blade means, but actually there is some slight difference which must be considered in order to achieve the desired results. For example, if the base 85 of the board 86 being grooved (FIGS. 3 and 4) is of ⅜ of an inch dimensional material, such as pressboard, it is known that the thickness may well vary as much as .020 of an inch, or .010 plus or minus with respect to the ⅜ of an inch thickness designated. Accordingly, to groove such a board the cutting blade means 56 is adjusted to extend no more than 0.365 of an inch above the level of the work table 11—i.e., 0.010 of an inch, less than the quoted ⅜ of an inch thickness, or substantially equivalent to the least thickness of the base 85. It is for this reason that the board must be at least slightly flexible—i.e., sufficiently flexible to deflect sufficiently across the span of the hiatus an amount equivalent at least to the variation in thickness of the base material.

With the rabbet cutting blade means 56 thus positioned both laterally and vertically, the collar 66 is slid along head bar 40 until the control shoe 70 is positioned vertically above the blade cutting means 56 and the set bolts 68 and 69 are then tightened to maintain this position. After being thus laterally positioned, the control shoe is rotated to adjust its position vertically by screwing the threaded shank 71 downwardly out of the boss 72 until the distance between the shoe 70 and the highest tip of the cutting blade means 56 is exactly equal to the thickness of the decorative facing 87 laminarly bonded to the base 85 of board 86. Often the facing is no more than two or three thousandths of an inch thick, so it is necessary to gauge every tooth on the cutting blade means 56 so that none of the teeth will extend closer to the control shoe 70 than the thickness of the decorative facing. The position of shoe 70 is maintained by tightening lock nut 73 tightly against boss 72.

With the apparatus thus adjusted the flexible board 86 is placed on the feed portion 12 of work table 11 with one edge against guide means 83 and with that edge maintaining contact with the guide means 83, the board 86 is pushed or driven by suitable means not shown toward the receiving portion 13. As the forward edge of the board leaves the feed portion 12 it is supported by the yielding support means 78. After the leading edge of the board 86 has progressed approximately half way across the hiatus 19, the facing will contact the control shoe 70 and the reverse side of the board—i.e., the base 85—will contact the cutting blade means 56. If the initial engaging portion of the control shoe 70 is slightly beveled it has been found to facilitate passage of the leading edge of the board past the shoe and toward the receiving portion 13.

As the mitered rabbet is cut into the base 85 the yielding support means 78 compensates for the variation in thickness of the base. As the base material becomes thicker than the distance between the work table and the uppermost reach of the blade cutting means 56, the support means yields downwardly away from the control shoe 70 to permit unobstructed passage of the board as it is deflected downwardly by the shoe 70. Of course, the board itself must have some modicum of flexibility in order to depress the required amount at the middle span of the hiatus 19 without binding. Any board with this determinative amount of flexibility is adapted to the present concept.

After the board has been thus mitered it is glued along the miter, folded and maintained until the adhesive bond at the fold is thoroughly set. Of course, the board may be rabbeted along a multiplicity of lines which may be oriented in any number of directions to permit folding to a preselected shape. In this case it is desirable to make all the cuts prior folding.

Figure 9:
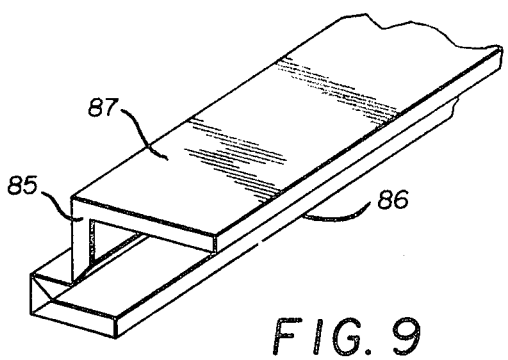
FIG. 9 is a perspective view of a typical multi-folded sheet grooved in accordance with the concept of the present invention.

An example of a molded device constructed by folding along a plurality of cuts is shown in FIG. 9 as being exemplary of the complex constructions readily feasible in such a device.

The apparatus hereinbefore described is as similarly adapted to groove fibrous unclad sheets as it is to groove sheets which are clad with a decorative film.

Figure 5:
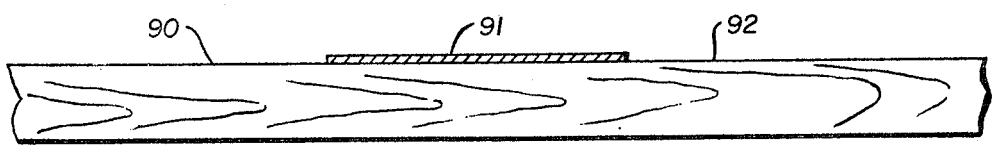
FIG. 5 is an end elevation of a non-clad sheet to be folded in accordance with the concept of the present invention.

For example, should it be desired to fold a sheet of fibrous material or a composite sheet having a slightly flexible but brittle facing—such as a high pressure laminate in such a way that the surface fibers, or grain, is not cut—such as the board 90 shown in FIG. 5—a strip of pliable pressure sensitive adhesive tape 91 is applied to that surface 92 of the board 90 which is to be the uncut surface. The tape 91 need be sufficiently wide to be interposed between the board 90 and the control shoe 70 along the full length of the fold line and to bond the board laterally together, as is hereinafter more fully explained.

The lateral and vertical position of the rabbet cutting blade means 56 is set with regard to the location of the groove and the thickness of the board 90 in the same fashion as described in detail above.

Figure 6:
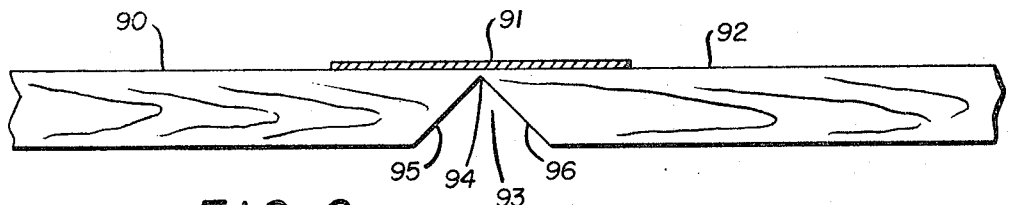
FIG. 6 is a view similar to FIG. 5 depicting the sheet therein after it has been grooved with a mitered rabbet.

However, the shoe is not placed at exactly the same distance above the uppermost reach of the teeth 59 of the cutting blade means 56 as the thickness of the tape 91, since that would permit the surface fibers of board 90 to be cut. Instead, the spacing between the tip of the teeth 59 on blade means 56 and the control shoe 70 is equivalent to the thickness of the tape 91 plus a few thousandths of an inch so that the mitered kerf, or groove, 93 does not completely penetrate the board 90. The remaining fibers 94 are depicted in exaggerated thickness in FIG. 6. Actually, this thickness is so minuscule that the tape 91 supplies the bond or support which retains the unity of the board across the groove 93.

Figure 8:
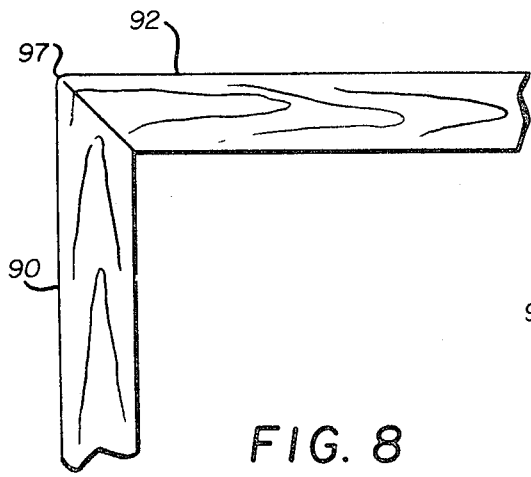
FIG. 8 is a view similar to FIG. 7 depicting the finished corner.
Figure 7:
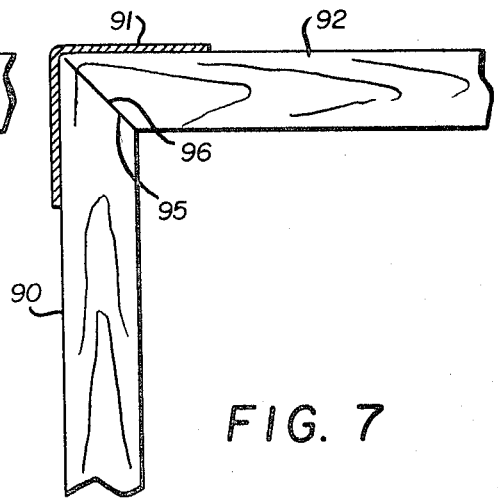
FIG. 7 is a view similar to FIG. 6 after the sheet has been folded along the groove.

With the tape 91 retained in place along the fold line, a suitable adhesive is applied to the beveled surfaces 95 and 96 of the rabbeted groove 93 and the board is folded until the surfaces 95 and 96 engage. The fibers 94, because of their minute thickness, readily bend around the folded edge and when the surfaces 95 and 96 are bonded together the tape 91 may be removed, as in FIG. 8, to reveal an unbroken corner 97.

It should be apparent from the foregoing description that the method disclosed herein permits grooving a board of flexible sheet material either inherently a laminar composite, as when clad with a decorative facing, or temporarily a laminar composite, as when a tape is applied to the sheet, accurately and to a uniform tolerance less than the variation in the thickness of the board.

What is claimed is:

1. A method for folding flexible sheet material comprising the steps of adhering a binding tape to the face of the sheet at least spanning the line along which the sheet is to be folded, rabbeting a mitered groove in the reverse side of said sheet, applying an adhesive to said mitered groove, bending said sheet along said groove, permitting said adhesive to set and removing said binding tape.

2. A method for folding flexible sheet material comprising the steps of adhering a binding tape to the face of the sheet at least spanning the line along which the sheet is to be folded, rabbeting a mitered groove in the reverse side of said sheet to within a few thousandths of an inch of said binding tape, applying an adhesive to said mitered groove, bending said sheet along said groove, permitting said adhesive to set and removing said binding tape.

References Cited

UNITED STATES PATENTS

| | | | |
|---|---|---|---|
| 1,133,106 | 3/1915 | Cuppett | 144—309 |
| 1,881,734 | 10/1932 | Lewis | 144—309 |
| 2,081,638 | 5/1937 | Owens | 144—254 |
| 2,252,539 | 8/1941 | Adams | 156—258 |
| 2,487,951 | 11/1949 | Stein | 156—211 |
| 2,542,860 | 2/1951 | Clements | 144—309 |
| 3,092,529 | 6/1963 | Pearson | 156—257 |

GERALD A. DOST, Primary Examiner

U.S. Cl. X.R.

144—319; 156—211, 258